United States Patent
Kerner et al.

[11] Patent Number: 5,803,421
[45] Date of Patent: Sep. 8, 1998

[54] CUP HOLDER WITH A HOUSING INTEGRATED INTO A CENTER CONSOLE OF A PASSENGER CAR

[75] Inventors: Wolfgang Kerner, Bondorf; Peter Seifert, Weil der Stadt, both of Germany

[73] Assignee: Mercedes-Benz AG, Germany

[21] Appl. No.: 714,485

[22] Filed: Sep. 16, 1996

[30] Foreign Application Priority Data

Sep. 16, 1995 [DE] Germany .................. 195 34 435.9

[51] Int. Cl.6 .................................................. A47K 1/08
[52] U.S. Cl. .................. 248/311.2; 200/524; 224/281; 224/282; 224/926; 296/37.13
[58] Field of Search ................... 248/311.2, 298.1, 248/314; 224/281, 282, 926, 483; 296/37.12, 37.13; 200/524

[56] References Cited

U.S. PATENT DOCUMENTS

| | | | |
|---|---|---|---|
| 3,899,982 | 8/1975 | Fetzek | 108/25 |
| 4,907,775 | 3/1990 | Lorence et al. | 248/311.2 |
| 4,953,771 | 9/1990 | Fischer et al. | 224/926 |
| 4,981,277 | 1/1991 | Elwell | 224/281 |
| 5,060,899 | 10/1991 | Lorence et al. | 248/311.2 |
| 5,171,061 | 12/1992 | Marcusen | 248/311.2 |
| 5,228,611 | 7/1993 | Yabuya | 248/311.2 |
| 5,284,314 | 2/1994 | Misaras et al. | 248/311.2 |
| 5,395,084 | 3/1995 | Ikuma | 248/311.2 |
| 5,487,519 | 1/1996 | Grabowski | 248/311.2 |

FOREIGN PATENT DOCUMENTS

4423097A1  1/1995  Germany .

*Primary Examiner*—Ramon O. Ramirez
*Assistant Examiner*—Anita M. King
*Attorney, Agent, or Firm*—Evenson, McKeown, Edwards & Lenahan, P.L.L.C.

[57] ABSTRACT

Cup holder with a housing is integrated into a center console of a passenger car. The cup holder includes a supporting carriage which has a stable one-piece frame in which two recesses are arranged as cup receiving devices. The supporting carriage is arranged in such a manner on a supporting arm guided linearly along the moving range that, in the moving range between a first and a second operating position, the frame can additionally be swivelled about a swivel pin horizontally relative to the supporting arm.

20 Claims, 2 Drawing Sheets

CUP HOLDER WITH A HOUSING INTEGRATED INTO A CENTER CONSOLE OF A PASSENGER CAR

BACKGROUND AND SUMMARY OF THE INVENTION

This invention relates to a cup holder with a housing which is integrated into a center console of a passenger car, and with a supporting carriage which is disposed in the housing and can be moved out of the housing by means of a linear guide along a limited moving range and which is provided with receiving devices for two beverage containers, in which case the supporting carriage can be fixed in a first operating position of the moving range in which an individual beverage container can be accommodated as well as in a second operating position of the moving range in which both beverage containers can be accommodated.

A cup holder of this type is known from U.S. Patent Document U.S. Pat. No. 5,060,899. The known cup holder has a cassette-type housing which can be integrated into a center console or into other areas of the interior fittings of a passenger car, as in a center arm rest of a rear seat bench. The cup holder has a supporting carriage in whose top side a recess for an individual beverage container is provided. By means of a linear guide, the supporting carriage can be moved out of the housing along a limited moving range. The supporting carriage is constructed in the manner of a box and is open toward one side. Out of this open side, a holding arm for a second beverage container can be swivelled laterally out of the supporting carriage as soon as the supporting carriage is moved out of the housing. As a result, it is possible to deposit two beverage containers simultaneously in the cup holder. Because of the bearing of the holding arm within the supporting carriage and the swivelling out from the supporting carriage, the cup holder has a relatively high-expenditure mechanism.

It is an object of the invention to provide a cup holder of the initially mentioned type which has a simple design and nevertheless ensures a secure accommodation of two beverage containers.

This object is achieved in that the supporting carrier has a stable one-piece frame in which two recesses are arranged as the receiving device and which is arranged in such a manner on a supporting arm linearly guided along the moving range that, in the moving range between the first and the second operating position, the frame can additionally be horizontally swivelled about a swivel pin relative to the supporting arm. As the result of the solution according to the invention, the cup holder requires fewer component parts so that two beverage containers can be accommodated simultaneously because both receiving devices for the beverage containers are arranged in a common frame. The mechanism of the cup holder is also significantly simplified because only the one-piece frame must be horizontally swivelled in a simple manner. In addition, the supporting arm forms a support for the frame carrying the receiving devices for the beverage containers.

In a further development of the inventions a rear-side end area of the frame is provided with an edge which is curved corresponding to a radius which is concentric to the swivel pin, which edge permits a swivelling of the frame in the moving range between the first and the second operating position. As a result, it is possible, during the moving out of the housing, to swivel the frame already immediately after the first operating position, whereby the bending forces affecting the supporting arm are kept relatively low.

In a further development of the invention, the rear-side end area is provided with a supporting nose which is supported on the housing side in the second operating position of the frame. As a result, bending moments on the frame or on the supporting arm are reduced further. It is particularly advantageous for the supporting nose to be supported in a housing-side guide groove in such a manner that it is secured against a breaking-out in the upward as well as in the downward direction.

In a further development of the invention, the supporting arm reaches under the frame beyond half the frame length. The supporting arm therefore supports the frame so that the frame can be dimensioned to be lighter.

In a further development of the invention, detent devices are provided for locking the frame in its inoperative position as well as in the first and in the second operating position. As a the result, all operating positions, including the inoperative position of the frame, are provided at defined points of the moving range.

In a further development of the invention, driving devices are provided for automatically moving the frame out of its inoperative position at least into the first operating position and for the automatic swivelling into the second operating position. In a further development of the invention, spring elements are assigned as driving devices to the linear guide as well as to the swivel pin. As the result, by means of simple devices, an automatic moving-out and swivelling of the frame into its first and its second operating position is achieved without the requirement of providing high-expenditure driving devices, such as electric or pneumatic actuating drives.

Other objects, advantages and novel features of the present invention will become apparent from the following detailed description of the invention when considered in conjunction with the accompanying drawings.

DETAILED DESCRIPTION OF THE INVENTION

Figure 1:
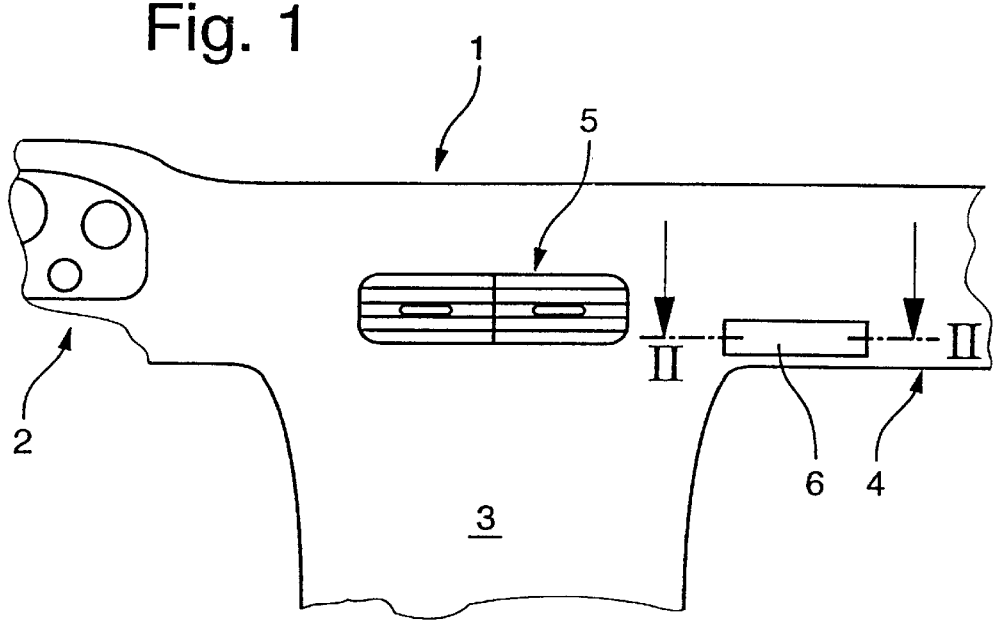
FIG. 1 is a schematic front view of a portion of a center console for a passenger car in which an embodiment of a cup holder according to the invention is integrated.

A center console 1 of a passenger car has a driver-side area 2 which is equipped with various driving condition fittings, such as the speedometer, the gasoline gauge and similar devices and to which a steering wheel is assigned. Between The driver-side area 2 and the front-passenger-side area 4 of the center console 1, a center area 3 is provided to which various operating devices, such as the radio, the vehicle computer, the air conditioner, the heater as well as center outlet nozzles 5 of the vehicle ventilation are assigned. In a transition area between the center area 3 and the front-passenger-side area 4, specifically between the center area and a cover shell, which is not shown, for a front passenger air bag, a housing for a cup holder 6 is integrated in the center console 1. The housing of the cup holder 6 is constructed to be relatively flat in a cassette-type manner and is horizontally arranged inside the center console 1. The housing has a parallelepiped-shaped hollow space 7 which is open in the direction of the front side of the center console 1 and therefore toward the front passenger.

Figure 2:
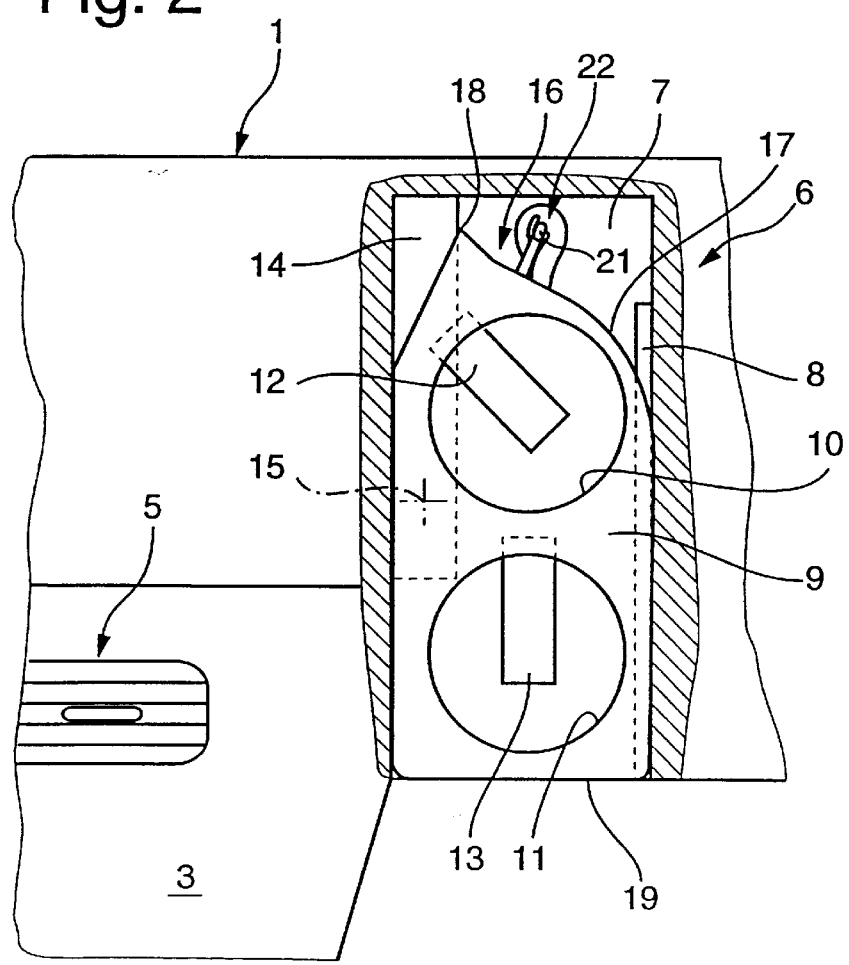
FIG. 2 is an enlarged sectional representation of the cup holder along the intersection II—II in FIG. 1.
Figure 4:
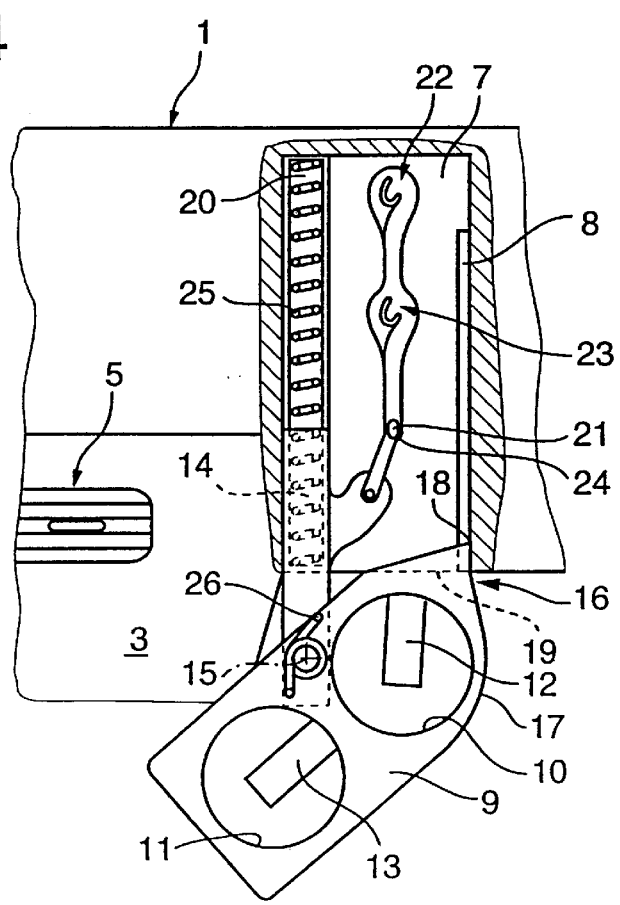
FIG. 4 is a view of the cup holder according to FIGS. 1 to 3 in a position which corresponds to its second operating position.

In the hollow space 7, a supporting carriage 9 is disposed which is arranged by means of linear guides 8, 20 to be linearly movable in the housing between an inoperative position illustrated in FIG. 2 and a second operating position illustrated in FIG. 4. The supporting carriage has a frame 9 whose lateral edges extend in parallel with respect to one another and are designed relative to the lateral walls of the hollow space 7 in such manner that they slide along the latter when the frame 9 is moved out of the housing. In the area of one lateral wall, the hollow space 7 has a groove-type guide rail 8 as the linear guide, in which case the groove is bounded by two guide webs which flank the frame 9 above and below it. In the area of the other lateral wall, the bottom of the hollow space 7 is provided with the linear guide 20 in the form of a groove-type indentation which extends along the whole length of the hollow space 7 and is used as a linear guide for a supporting arm 14 which will be described in detail in the following.

This supporting arm 14 is also secured in the linear guide 20 against a swivelling-out in the upward direction by a corresponding groove design on the underside of the supporting arm 14 which, however, is not shown. The supporting arm 14 is embedded in the guide grove 20 and has a plate-type construction. The supporting arm 14 reaches under the frame 9 in parallel to beyond half the frame 9. The frame 9 is arranged on the supporting arm 14 so that it can be horizontally swivelled about a vertical swivel pin 15.

The frame 9 has two circular recesses 10 and 11 which are used as receiving devices for one beverage container respectively. One bottom support 12, 13 respectively is assigned to each recess 10, 11 and is positioned at a distance below the recess 10, 11. This bottom support 12, 13 is used as a rest for depositing a corresponding beverage container. The two recesses 10, 11 are arranged behind one another in the longitudinal direction of the frame 9 behind one another in a spaced manner.

A rear-side end area 16 of the frame 9 is provided with an edge 17 curved in a circular-arc-shaped manner, in which case the radius of the circular-arc-shaped curved edge extends concentrically with respect to the swivel pin 15. In addition, in the rear-side end area 16, a supporting nose 18, which adjoins the edge 17, is formed in the shape of a corner of the frame 9 which is pulled diagonally toward the rear. In a second operating position of the frame 9, which will be described in detail in the following, this supporting nose 18 is supported in the area of an opening 19 of the hollow space 7 in the guide groove 8 and is therefore used for the rear-side support of the frame 9.

Figure 3:
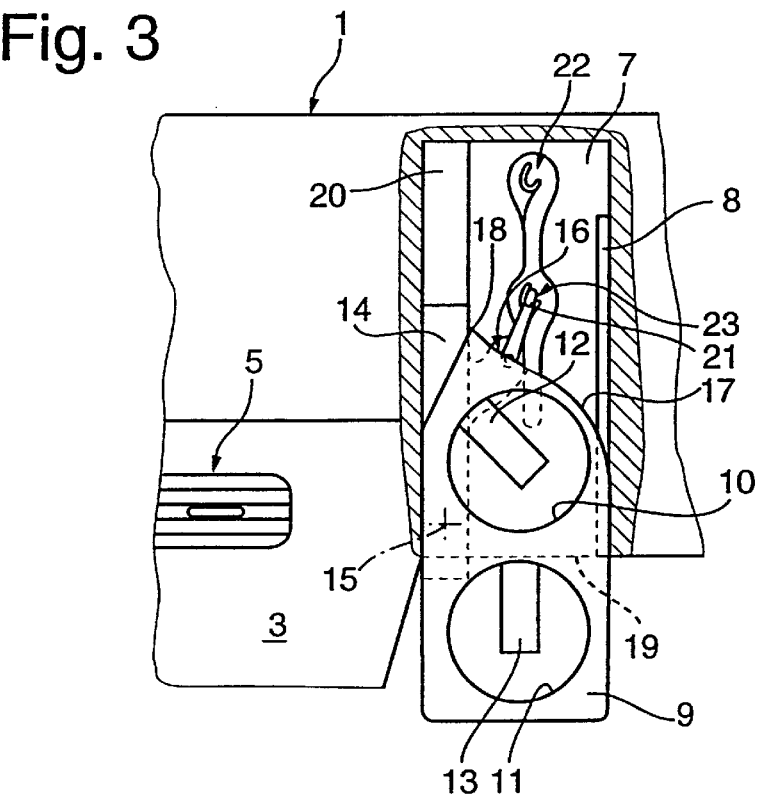
FIG. 3 is a representation similar to FIG. 2 of the cup holder according to FIGS. 1 and 2, in which the cup holder is in a first operating position.

By means of the above-described linear guides, the frame 9, including the supporting arm 14, can be changed from its inoperative position illustrated in FIG. 2 first into a first operating position according to FIG. 3 in which the forward recess 11 projects out of the housing and is freely accessible to the driver or front passenger. A locking pin 21 is rotatably coupled to the supporting arm 14, or to the frame 9. The locking pin 21 engages a detent 22 to lock the frame 9 in the inoperative position. The locking pin 21 engages a detent 23 to lock the frame 9 in the first operating position. The locking pin 21 engages a detent or slot end 24 to lock the frame 9 in the second operating position. The distal end of the locking pin 21 slides along a slot between the detents 22, 23, 24 as the cup holder is moved between the inoperative position, the first operating position, and the second operating position. So that the frame 9 including the supporting arm 14 can be moved automatically out of its inoperative position into the first operating position and further into the second operating position out of the hollow space 7 as soon as the locking pin 21 is disengaged from the corresponding detent, driving devices 25, 26 constructed in the form of spring elements which permit linear and rotational movements are provided.

As soon as the frame 9 is moved from a first operating position according to FIG. 3 in the direction of its second operating position according to FIG. 4 further out of the housing, the edge 17 of the rear-side end area 16 of the frame 9 arrives at the level of the opening 19 of the hollow space 7. Since the length of the radius of the edge 17 is coordinated with the distance of the swivel pin 15 from the opposite lateral wall of the hollow space 7, in this position, an additional swivelling of the frame 9 about the swivel pin 15 is possible. Simultaneously, the supporting arm 14 has reached its forward stop position. The frame 9 therefore swivels clockwise (FIG. 4) supported by a spring horizontally until the supporting nose 18 strikes in the area of the guide groove 8 against the lateral wall of the hollow space 7 directly behind the opening 19. Now the second operating position is reached in which also the rear recess 10 is positioned outside the housing of the cup holder 6. In this position, the two recesses 10 and 11 are arranged in a horizontal plane to be diagonally offset with respect to one another. As a result, the recess 11 for a driver and the recess 10 for a front passenger can be achieved in a simple manner.

Since the recesses 10 and 11 are positioned only at relatively short distances with respect to the swivel pin 14 in the transverse direction of the vehicle, there is no danger to a vehicle occupant as a result of a triggering air bag for a beverage in recess 10, and a covering of operating and assembly components by a beverage in the recess 11 also does not have to be feared. Because of the diagonal position of the frame 9, the whole length of the frame 9 does not act as a lever arm so that the bending moment on the supporting arm 14 and on the frame itself is reduced. By means of its supporting function, the supporting nose 18 further improves the stability of the frame 9 in its second operating position. The swivelling of the frame 9 about the swivel pin 15 from the first operating position into the second operating position also takes place automatically by the spring force support in the form of a spiral spring or leg spring (driving device 26) which, relative to the representation according to FIGS. 2 to 4, acts clockwise.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A cup holder which is installable into a center console of a passenger car, comprising:
   a housing having a linear guide;
   a supporting carriage which is disposed in the housing and is movable out of the housing via the linear guide along a limited moving range, and which has receiving devices for two beverage containers, said supporting carriage being movable into a first operating position of the moving range, in which only an individual beverage container can be accommodated, and a second operating position of the moving range, in which both beverage containers can be accommodated; and a supporting arm which is movable and guided linearly along the movement range;

wherein the supporting carriage has a stable one-piece frame in which two recesses are arranged as the receiving devices and which is arranged on said supporting arm in such a manner that, in the moving range between the first and the second operating position, the frame can additionally be swivelled about a swivel pin horizontally relative to the supporting arm.

2. The cup holder according to claim 1, wherein a rear-side end area of the frame is provided with an edge which is curved corresponding to a radius concentric to the swivel pin, and which permits a swivelling of the frame in the moving range between the first and the second operating position.

3. The cup holder according to claim 2, wherein the rear-side end area is provided with a supporting nose which is supported on a side of the housing in the second operating position of the frame.

4. The cup holder according to claim 3, wherein the supporting nose is supported in a housing-side guide groove.

5. The cup holder according to claim 4, wherein the supporting arm reaches under the frame beyond half the frame length.

6. The cup holder according to claim 5, wherein detent devices are provided for locking the frame in its inoperative position as well as in the first and in the second operating position.

7. The cup holder according to claim 6, wherein driving devices are provided for automatically moving the frame out of its inoperative position at least into the first operating position and for automatically swivelling the frame into the second operating position.

8. The cup holder according to claim 7, wherein spring elements are assigned as the driving devices to the linear guide as well as to the swivel pin.

9. The cup holder according to claim 4, wherein driving devices are provided for automatically moving the frame out of its inoperative position at least into the first operating position and for automatically swivelling the frame into the second operating position.

10. The cup holder according to claim 9, wherein spring elements are assigned as the driving devices to the linear guide as well as to the swivel pin.

11. The cup holder according to claim 1, wherein the supporting arm reaches under the frame beyond half the frame length.

12. The cup holder according to claim 1, wherein detent devices are provided for locking the frame in its inoperative position as well as in the first and in the second operating position.

13. The cup holder according to claim 1, wherein driving devices are provided for automatically moving the frame out of its inoperative position at least into the first operating position and for automatically swivelling the frame into the second operating position.

14. The cup holder according to claim 13, wherein spring elements are assigned as the driving devices to the linear guide as well as to the swivel pin.

15. A cup holder assembly for a passenger car, comprising:

a guide disposable in a vehicle console opening which in use faces a vehicle passenger;

a cup support frame with a least a first cup supporting opening and a second cup supporting opening, said cup support frame being slidably disposed at said guide for movement between a closed position and a first operating position wherein only said first cup supporting opening is accessible outside said vehicle console in an installed position of said holder, and a second operating position wherein both of said first and second cup support openings are accessible outside said vehicle console in an installed position of said holder; and a supporting arm guided by said guide and including a pivotal connection with the cup support frame;

wherein said frame is rotatable about said pivotal connection between said first and second operating positions.

16. The cup holder assembly according to claim 15, wherein said guide includes two spaced parallel guide tracks which in use extend along opposite lateral sides of the vehicle console opening.

17. The cup holder assembly according to claim 16, wherein said supporting arm is slidably guided at one of said guide tracks.

18. The cup holder assembly according to claim 17, comprising respective holding detents at said supporting arm, said cup support frame, and said guide for facilitating holding of said cup support frame in each of the closed position, the first operating position and the second operating position, said holding detents being releasable and engagable by passenger manual manipulation of the cup support holder.

19. The cup holder assembly according to claim 15, comprising respective holding detents at said supporting arm, said cup support frame, and said guide for facilitating holding of said cup support frame in each of the closed position, the first operating position and the second operating position, said holding detents being releasable and engagable by passenger manual manipulation of the cup support frame.

20. The cup holder assembly according to claim 15, wherein said cup support frame has two of said cup support openings, and wherein said cup support frame is a unitary one piece frame part.

* * * * *